Nov. 13, 1923.  1,474,238
G. C. CHASE
SELECTOR MECHANISM FOR CALCULATING MACHINES
Filed May 12, 1922  5 Sheets-Sheet 1
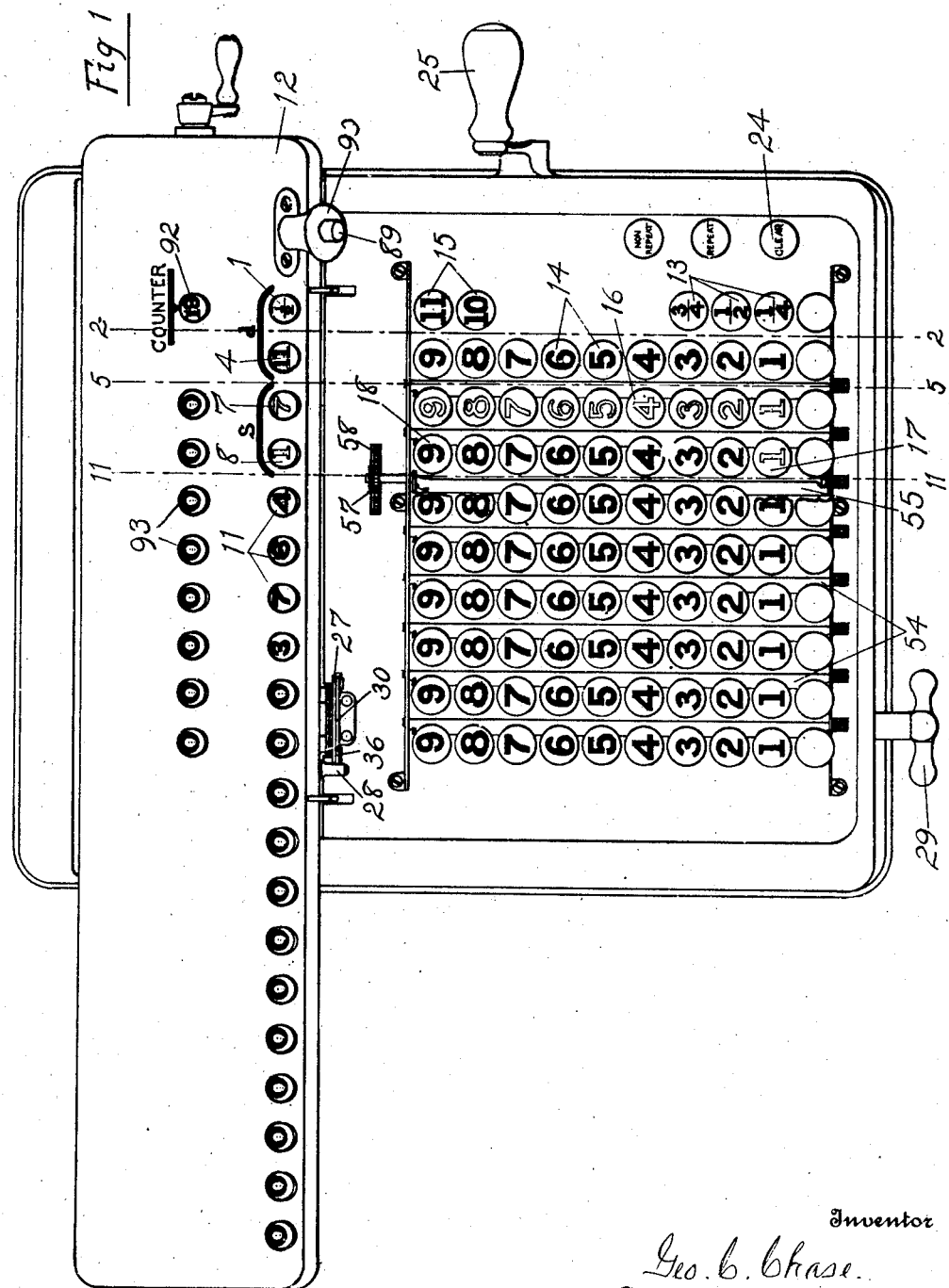
Inventor
Geo. C. Chase.
E. M. Anderson Jr.
By
Attorney Nov. 13, 1923.  1,474,238
G. C. CHASE
SELECTOR MECHANISM FOR CALCULATING MACHINES
Filed May 12, 1922   5 Sheets-Sheet 2
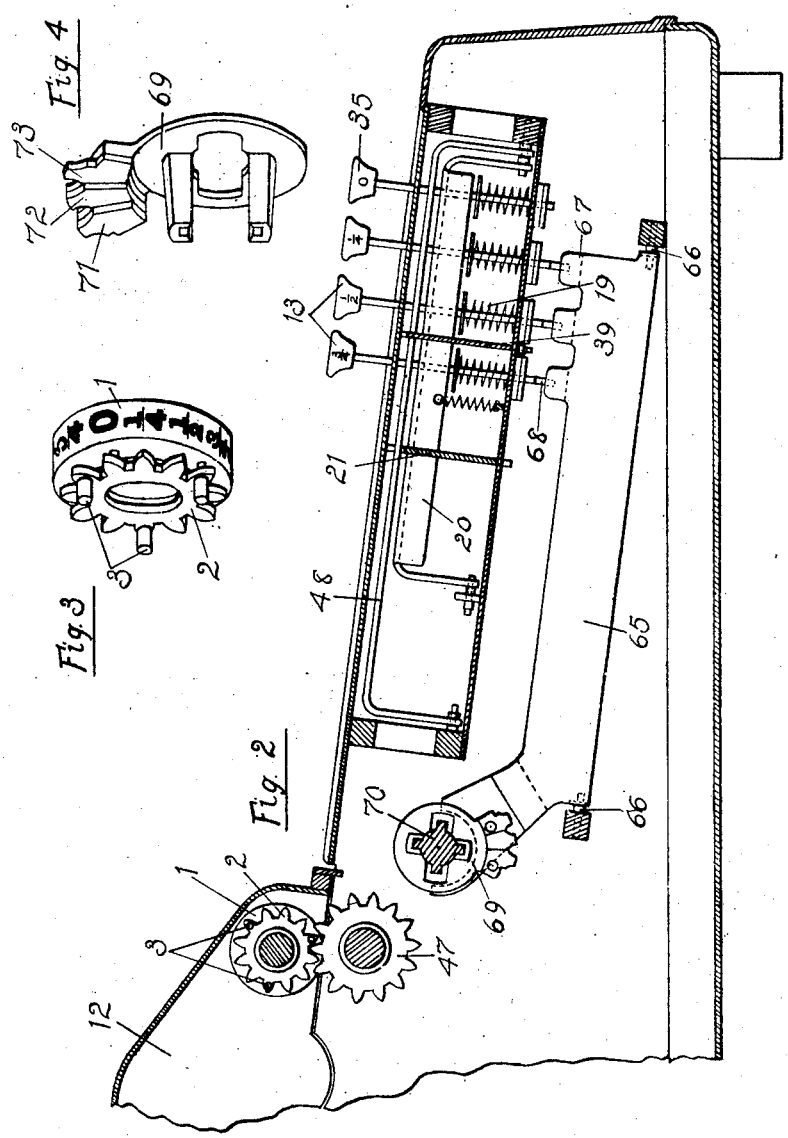
Inventor
Geo. C. Chase
E. D. Anderson
By
Attorney

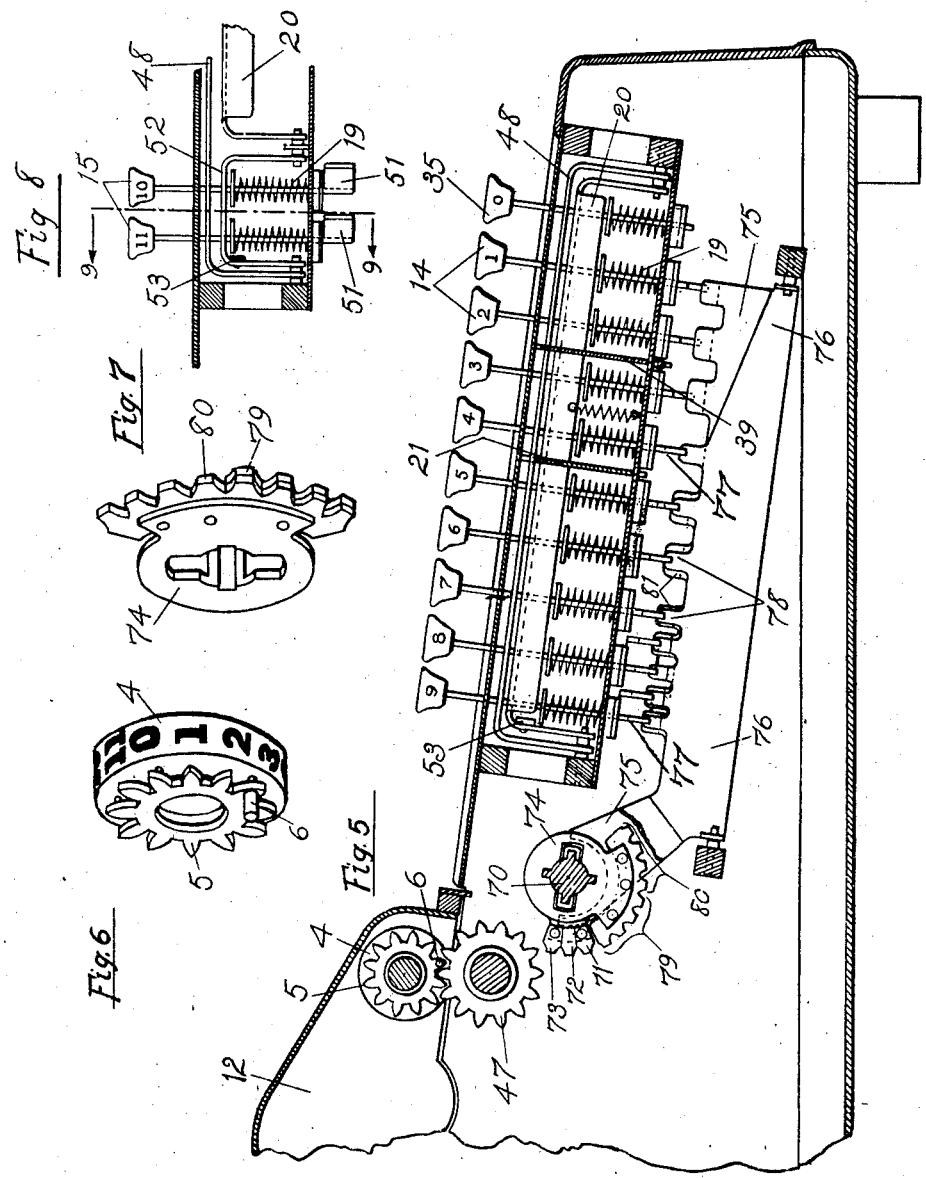

Nov. 13, 1923.
G. C. CHASE
1,474,238
SELECTOR MECHANISM FOR CALCULATING MACHINES
Filed May 12, 1922　　5 Sheets-Sheet 4
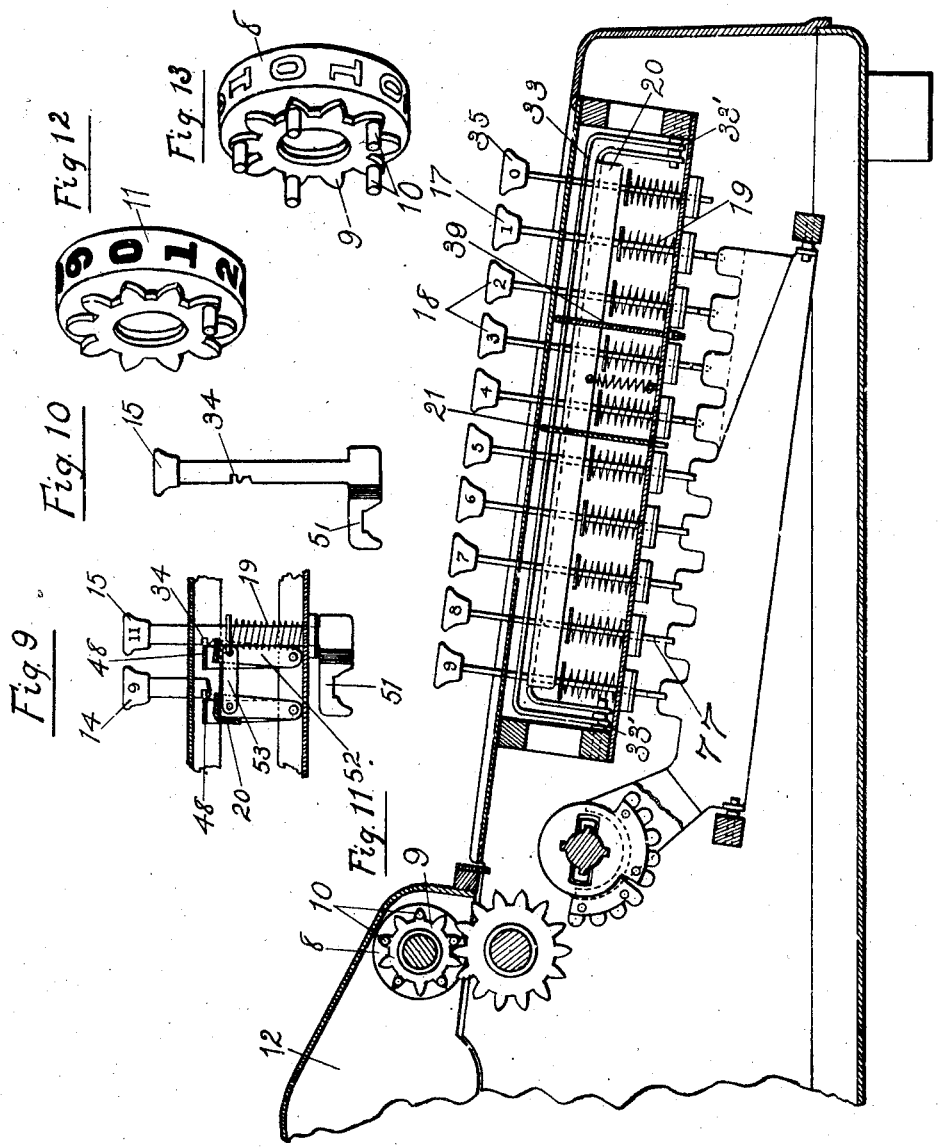
Inventor
Geo. C. Chase
E. W. Anderson
By
Attorney Nov. 13, 1923.  1,474,238
G. C. CHASE
SELECTOR MECHANISM FOR CALCULATING MACHINES
Filed May 12, 1922  5 Sheets-Sheet 5

7THS.

8THS.

9THS.

10THS.

11THS.

12THS.

13THS.

14THS.

15THS.

16THS.

17THS.

18THS.

19THS.

20THS.

Inventor
Geo. C. Chase
E.D. Anderson
Attorneys

Patented Nov. 13, 1923.

1,474,238

UNITED STATES PATENT OFFICE.

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF NEW YORK.

SELECTOR MECHANISM FOR CALCULATING MACHINES.

Application filed May 12, 1922. Serial No. 560,360.

*To all whom it may concern:*

Be it known that I, GEORGE C. CHASE, a citizen of the United States of America, resident of South Orange, in the county of Essex and State of New Jersey, have made a certain new and useful Invention in Selector Mechanism for Calculating Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention relates to a calculating machine wherein values set up by means of the selecting mechanism are subsequently registered upon the numeral wheels by the action of appropriate mechanism.

The invention is equally applicable to machines operating upon the decimal system exclusively, or to machines operating upon the fractional or mixed-denominator principle.

One object of the invention is to provide a selector mechanism wherein a minimum of setting movement of the selector members will be required to effect a maximum selective registering movement of the numeral wheels. Another object is to provide a selector mechanism which will be pecularily adapted for calculations in British currency or other fractional denominations. Other objects and advantages will appear hereinafter.

The invention consists in the novel construction and combination of parts as hereinafter set forth.

In the accompanying drawings, illustrating an embodiment of the invention as applied to calculating machines of the general type and character disclosed in United States Patents (Reissue) No. 13,841, and No. 1,306,606.

Figure 1 is a top plan view of the machine.

Figure 2 is a section on line 2—2 of Figure 1, showing the farthings registering mechanism.

Figure 3 is a detail perspective view of the farthings numeral wheel.

Figure 4 is a detail perspective view of the farthings selector gear.

Figure 5 is a section on line 5—5 of Figure 1, showing the pence registering mechanism.

Figure 6 is a detail perspective view of the pence numeral wheel.

Figure 7 is a detail perspective view of one of the pence selector gears.

Figure 8 is a section on line 2—2 of Figure 1, showing the ten and eleven pence keys, omitted from Figure 2.

Figure 9 is a section on line 9—9 of Figure 8, showing the nine and eleven pence keys.

Figure 10 is a detail side view of a ten or eleven pence key.

Figure 11 is a section on line 11—11 of Figure 1, showing the ten shillings registering mechanism.

Figure 12 is a detail perspective view of a pounds numeral wheel.

Figure 13 is a detail perspective view of the tens of shillings numeral wheel.

Figure 14:
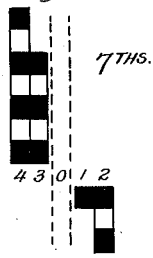
Figure 15:
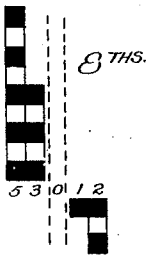
Figure 16:
Figure 17:
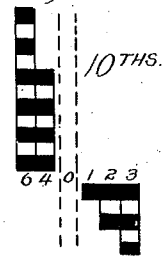
Figure 18:
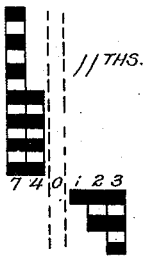
Figure 19:
Figure 20:
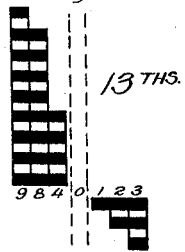
Figure 21:
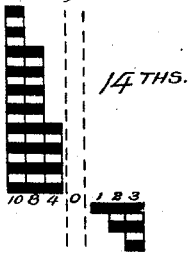
Figure 22:
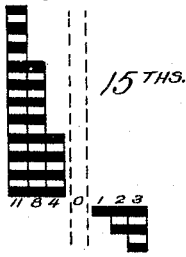
Figure 23:
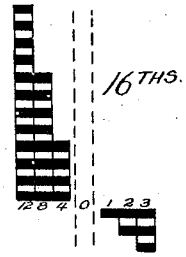
Figure 24:
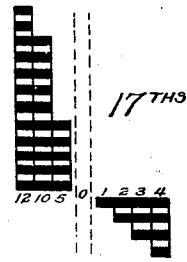
Figure 25:
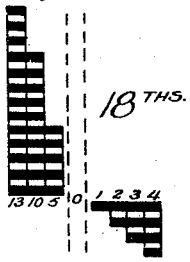
Figure 26:
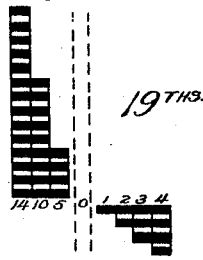
Figure 27:
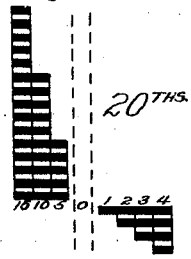

Figures 14 to 27, inclusive, are diagrammatic views, showing the selector gears arranged for handling various fractions, from 7ths to 20ths.

Numeral wheels and keyboard.

In these drawings, Figure 1 shows a plan view of a machine which may be characterized as a key-set, reversible-crank-operated, reversible-numeral-wheel calculator. As illustrated, the numeral wheels are adapted to be shifted transversely relative to the keyboard, as in the patent hereinbefore mentioned and as in my co-pending application No. 560,359, filed of even date herewith, upon which Patent No. 1,468,992, was issued September 25, 1923. For the purposes of the present application, however, the relative positions of these parts may be regarded as fixed.

A farthings numeral wheel 1 (Figures 1, 2 and 3) is provided with three sets of numerals, each set having four figures, namely ¼, ½, ¾ and 0, and has twelve gear teeth 2 and three carry tripping pins 3. The number of sets of figures and carry tripping pins may be varied if desired. The pence numeral wheel 4 (Figures 1, 5 and 6) is provided with one set of twelve figures, namely the nine digits and ten, eleven and 0. and like the farthings wheel 1 has twelve teeth. This pence wheel gear is provided with one carry tripping pin 6. The units of shillings numeral wheel 7 (Figure 1) is provided with one set of ten figures, namely one to nine, inclusive, and 0, and has ten gear teeth and one carry tripping pin, being precisely like the pounds numeral wheels 11 (Figure 12), except that it may be desirable to give the figures of the units of shillings wheel a distinctive color. The tens of shillings wheel 8, the fourth numeral wheel from the right in Figure 1 (Figures 1, 11, and 13) is provided with five sets of figures, each set having two numerals, namely one and 0 and the gear of this wheel has ten teeth and five carry tripping pins 10. The pounds numeral wheels 11 (Figure 12) are of the usual decimal character. Whenever any of these numeral wheels arrive at 0 the next higher numeral wheel will be advanced one step, by carry mechanism as disclosed in said patent.

The farthings numeral wheel is in vertical alignment and functions with the farthings keys 13 (Figures 1 and 2). The pence numeral wheel 4 aligns with the one to nine pence keys 14 (Figures 1 and 5). For convenience the ten and eleven pence keys 15 are placed in vertical alignment with the farthings keys, but operate in conjunction with the pence wheel 4. The units of shillings wheel 7 and the tens of shillings wheel 8 align with the units of shillings keys 16 and the ten shillings key 17 respectively. The keys illustrated as lying in column with the ten shillings key, and marked with the numerals two to nine, are not used in fractional calculations, and may be disregarded in the present description.

In order that the ten and eleven pence key stems shall actuate the same selector rockbars 75 and 76 as do the one to nine pence keys, the former key stems are provided with lower lateral extensions 51, which are long enough for the purpose stated but are offset sufficiently so as not to interfere with the corresponding parts of the eight and nine pence keys.

All of the keys of the machine are provided with springs 19, which act to raise the keys to their normal position, and each column of keys is provided with a universal bar 20, commonly known as a flexible keyboard lock bar (Figures 2, 5, 11, 8 and 9), these bars serving to retain the keys in depressed position and being operated to release the keys so that the latter may be raised to normal position by their springs. A keyboard release bar 21 (Figures 2, 11 and 5) common to all of the bars 20, operates the same to release all of the keys and clear the keyboard. The flexible keyboard lock-bar 20 for the farthings column is shorter than are the similar bars 20 of the higher column (Figure 2). The short flexible keyboard lock-bar 52 for the ten and eleven pence keys must operate in unison with the flexible keyboard lock-bar 20 for the one to nine pence keys, and to this end the said parts 20 and 52 are pivotally connected by a link 53 (Figures 9, 8 and 5) the result being that the ten and eleven pence keys may be cleared or released by the depression of any other of the pence keys or by the pence column release key 35.

*Fractional selector gear.*

Reissue Patent No. 13,841, and Patent No. 1,306,606, referred to, disclose means whereby the value of a depressed key may be set up on selector gears and thereafter registered on the numeral wheels by rotation of the operating crank. The modifications necessary to adapt the construction therein disclosed to British currency fractions will now be described.

Referring to Figure 2, the farthings rockbar 65 is pivoted at 66 to the framing and has extensions 67 which are engageable by key stem cams 68, which may be identical upon all of the keys of the machine, i. e., the extensions 67 may be arranged at different angles, so that the ¼ key moves the farthings rock-bar one unit, the ½ key moves said rock-bar two units, and the ¾ key moves said rock-bar three units. The rear end of the farthings rock bar 65 moves the farthings selector gear 69 (Figures 4 and 2) to the left upon the shaft 70, and this gear is provided with three teeth of graded length or extent, whereby when the farthings selector gear has been moved one unit to the left by the ¼ key, the tooth 71 only will be brought into position to engage with the farthings intermediate gear 47 and advance or retract the farthings numeral wheel, according to the direction of rotation of the operating crank 25. Whenever the ½ or ¾ keys are depressed, two teeth 71 and 72, or three teeth 71, 72 and 73, are respectively brought into operative alignment with the farthings intermediate gear 47.

In the registration of pence, the one, two and three pence keys and the pence intermediate driving gear 47 function with a duplicate of farthings selector gear 69. There is also provided in registering pence a selector gear 74 (Figures 5 and 7), provided with eight teeth of graded length or extent, four longer teeth 79 and four shorter teeth 80. In the pence order there are two pence rockbars 75 and 76, the one, two and three pence keys engaging with the right-hand rockbar 75 exclusively. The four and eight pence keys engage with the left-hand rockbar 76 exclusively, by means of the key stem cams 77, which may be identical upon all keys.

Extensions 78 of rock bar 76 are arranged at different angles, so that whenever the four pence key is depressed, gear 74 will be moved laterally one unit to the right, thereby bringing the four teeth 79 into alignment with the intermediate gear 47, and when the eight pence key is depressed, the gear 74 will be moved laterally two units to the right and all eight teeth 79 and 80 will be brought into operative alignment with the gear 47. The five, six, seven, nine, ten and eleven pence keys, through the key stem cams thereof, engage both the right-hand and the left-hand rock-bars 75 and 76, the angular extensions 78 and 81 of these bars being adapted to impart the proper degree of movement to the pence selector gears, as will now be explained.

In registering five pence, the pence selector gears are both moved toward each other, to bring the four teeth 79 and the one tooth 71 of the respective gears into operative alignment with the pence intermediate gear 47; in registering six pence said gears are both moved to bring the four teeth 79 and the two teeth 71 and 72 into operative alignment; in registering seven pence said gears are both moved to bring the four teeth 79 and the three teeth 71, 72 and 73 into operative alignment; in registering nine pence said gears are both moved to bring to all eight teeth 79 and 80 and the one tooth 71 into operative alignment; in registering ten pence both gears are moved to bring all eight teeth 79 and 80 and the two teeth 71 and 72 into operative alignment, and in registering eleven pence the gears are both moved to bring all eight teeth 79 and 80 and the three teeth 71, 72 and 73 into operative alignment.

All of the other selector rock-bars and selector gears of the machine are alike, and the latter may be similar to the selector gears just described or to those of said patent.

From the above description it will be noted that in order to employ the type of selector gears described in said Reissue Patent No. 13,841, in operations involving more than nine selective degrees of registering movement, it has been necessary to depart from the arrangement whereby one selector gear member is given a single step and the cooperating member a plurality of steps of lateral movement. Otherwise one of the pence selector gear members would have to be moved six steps, entailing an inordinate lengthening of the key stroke or an angle of the key stem cam which would render the keys practically inoperative. In adapting the machine for fractions other than British currency this difficulty might be increased by the requirement for more than eleven selective degrees of registering movement. In this connection it will be noted that whereas in said patent one selector gear member has four steps of lateral movement imparted thereto, the present invention, as applied to British currency, requires a maximum of three steps of lateral movement of the selector gears, so that the British currency fractions by no means tax the arrangement to the limit of its capacity.

In applying the invention to a decimal machine, various combinations may be employed, one selector member, for instance, being adapted to register one, two and three, and the other four and six. This improvement reduces the excessively abrupt camming action of the one, two, three and four side cam formerly used to actuate the rock-bar and thereby provides a smoother and more frictionless key setting action.

One arrangement, among several, by which the invention may be applied to each of the fractions from 7ths to 20ths is illustrated diagrammatically in Figures 14 to 27. These diagrams show the teeth of the two selector gears, the position of the intermediate gear being indicated in dotted lines. The combinations by which the different numerators are selected will be obvious.

I claim:

1. In a multiple order calculating machine, numeral wheels, and actuating mechanism therefor including two members related to a single order, each member adapted to be set selectively to one of a plurality of active positions to determine different degrees of registering movement of a single numeral wheel.

2. In a multiple order calculating machine, numeral wheels, actuating mechanism therefor including two members related to a single order, each member adapted to be set selectively to one of a plurality of active positions to determine different degrees of registering movement of a single numeral wheel, and digital selecting members including cam means for setting each actuating member.

3. In a multiple order calculating machine, numeral wheels, actuating mechanism therefor including two members related to a single order, one of said members being adapted to be set to position to determine a plurality of numerically successive degrees of registering movement of a numeral wheel, and the other member adapted to be set to position to determine a given number of degrees of registering movement of said wheel or a number of degrees corresponding to a multiple of said given number.

4. In a multiple order calculating machine, numeral wheels, actuating mechanism therefor including two members related to a single order, one of said members being adapted to be set to position to determine one, two or three degrees of registering movement of a numeral wheel, and the other member adapted to be set to position to determine four or eight degrees of registering movement of said wheel.

5. In a multiple order calculating machine, numeral wheels, actuating mechanism therefor including two gear members related to a single order and provided each with a plurality of teeth of graded length, and means for shifting said gear members laterally to bring a selected number of teeth into operative relation with a single numeral wheel.

6. In a multiple order calculating machine, numeral wheels, actuating mechanism therefor including two gear members related to a single order, one of the gears being provided with three teeth of graded length and the other gear being provided with eight teeth of two different lengths, and means for shifting said gear members laterally to bring a selected number of teeth into operative relation with a single numeral wheel.

7. In a multiple order calculating machine, numeral wheels, and actuating mechanism therefor including members adapted to be set selectively to five positions in each order to determine more than nine selective degrees of registering movement of the related wheel.

8. In a multiple order calculating machine, numeral wheels, actuating mechanism therefor including members adapted to be set selectively to five positions in each order to determine more than nine selective degrees of registering movement of the related wheel, and cam means for setting said actuating members, including setting devices and digital keys engaging the same.

9. In a multiple order calculating machine, numeral wheels, actuating mechanism therefor including members adapted to be set selectively to five positions in each order to determine more than nine selective degrees of registering movement of the related wheel, and cam means for setting said actuating members as stated, including setting devices and digital keys engaging the same and adapted to impart a maximum of three selective degrees of movement to any setting device.

In testimony whereof I affix my signature in presence of two witnesses.

GEORGE C. CHASE.

Witnesses:
LEE P. BROWN,
CLARENCE S. ZULLEN.